United States Patent
Miyamoto et al.

(10) Patent No.: US 10,797,465 B2
(45) Date of Patent: Oct. 6, 2020

(54) LASER APPARATUS

(71) Applicant: Gigaphoton Inc., Tochigi (JP)

(72) Inventors: Hirotaka Miyamoto, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 16/266,357

(22) Filed: Feb. 4, 2019

(65) Prior Publication Data

US 2019/0181607 A1 Jun. 13, 2019

Related U.S. Application Data

(63) Continuation of application No. PCT/JP2016/079158, filed on Sep. 30, 2016.

(51) Int. Cl.
*H01S 3/137* (2006.01)
*H01S 3/08* (2006.01)
(Continued)

(52) U.S. Cl.
CPC ............ *H01S 3/137* (2013.01); *G01J 3/0229* (2013.01); *H01S 3/08009* (2013.01);
(Continued)

(58) Field of Classification Search
CPC .... H01S 3/137; H01S 3/08009; H01S 3/0812; H01S 3/225; H01S 3/2251; H01S 3/2256
See application file for complete search history.

(56) References Cited

U.S. PATENT DOCUMENTS 6,192,064 B1 * 2/2001 Algots ................. G02B 5/1828
372/100
6,614,828 B1 9/2003 Basting et al.
(Continued)

FOREIGN PATENT DOCUMENTS

CN 102208753 A 10/2011
CN 103713360 A 4/2014
(Continued)

OTHER PUBLICATIONS

International Search Report issued in corresponding International Application No. PCT/JP2016/079158; dated Feb. 7, 2017.
(Continued)

*Primary Examiner* — Armando Rodriguez
(74) *Attorney, Agent, or Firm* — Studebaker & Brackett PC

(57) ABSTRACT

A laser apparatus includes first and second wavelength dispersion elements, an optical element, first and second actuators, and a control unit. The first wavelength dispersion element generates wavelength dispersion in a direction orthogonal to an electric discharge direction between a pair of electric discharge electrodes. The second wavelength dispersion element generates wavelength dispersion in a direction parallel to the electric discharge direction. The optical element corrects wavelength dispersion generated by the second wavelength dispersion element. The first actuator drives the first wavelength dispersion element. The second actuator drives the optical element. The control unit controls the first actuator so that the center wavelength of the laser light approaches to a target wavelength and controls the second actuator so as to correct the wavelength dispersion generated by the second wavelength dispersion element.

18 Claims, 14 Drawing Sheets

(51) Int. Cl.
  *G01J 3/02* (2006.01)
  *H01S 3/225* (2006.01)
  *H01S 3/081* (2006.01)

(52) U.S. Cl.
  CPC ............ *H01S 3/0812* (2013.01); *H01S 3/225* (2013.01); *H01S 3/2251* (2013.01); *H01S 3/2256* (2013.01)

(56) References Cited

U.S. PATENT DOCUMENTS

| | | |
|---|---|---|
| 2001/0014110 A1 | 8/2001 | Partlo et al. |
| 2008/0181262 A1 | 7/2008 | Wakabayashi et al. |
| 2013/0064258 A1 | 3/2013 | Fujimoto et al. |
| 2013/0208744 A1 | 8/2013 | Kumazaki et al. |
| 2015/0325980 A1 | 11/2015 | Fujita et al. |

FOREIGN PATENT DOCUMENTS

| | | |
|---|---|---|
| JP | H02-307285 A | 12/1990 |
| JP | H11-214803 A | 8/1999 |
| JP | 2001077453 A | 3/2001 |
| JP | 2003051634 A | 2/2003 |
| JP | 2003518757 A | 6/2003 |
| JP | 2004140265 A | 5/2004 |
| JP | 2004288874 A | 10/2004 |
| JP | 3590524 B2 | 11/2004 |
| JP | 2008016544 A | 1/2008 |
| JP | 2008098282 A | 4/2008 |
| JP | 4358052 B2 | 11/2009 |
| JP | 2009277977 A | 11/2009 |
| JP | 2011249832 A | 12/2011 |
| JP | 2013070029 A | 4/2013 |
| JP | 2013168473 A | 8/2013 |
| JP | 2014127651 A | 7/2014 |

OTHER PUBLICATIONS

International Preliminary Report on Patentability (Chapter I) and Written Opinion of the International Searching Authority; PCT/JP2016/079158; dated Apr. 2, 2019.

An Office Action mailed by China National Intellectual Property Administration dated Jun. 3, 2020, which corresponds to Chinese Patent Application No. 201680088181.5 and is related to U.S. Appl. No. 16/266,357 with English language translation.

\* cited by examiner

FIG. 12

LASER APPARATUS

CROSS REFERENCE TO RELATED APPLICATIONS

The present application is a continuation application of International Application No. PCT/JP2016/079158 filed on Sep. 30, 2016. The content of the application is incorporated herein by reference in its entirety.

BACKGROUND

1. Technical Field

The present disclosure relates to a laser apparatus and especially relates to a discharge excitation laser apparatus.

2. Related Art

Semiconductor exposure devices are required to have higher resolution as semiconductor integrated circuits are reduced in size and are more highly integrated. Semiconductor exposure devices are simply referred to as "exposure devices" below. Shortening has been advanced in wavelength of light outputted from a light source for exposure. For the light source for exposure, a gas laser apparatus is used instead of a conventional mercury lamp. A KrF excimer laser apparatus and an ArF excimer laser apparatus have been used as a gas laser apparatus for exposure at present. The KrF excimer laser apparatus outputs ultraviolet rays having the wavelength of 248 nm and the ArF excimer laser apparatus outputs ultraviolet rays having the wavelength of 193 nm.

As a present exposure technique, liquid immersion exposure is practically used. In the liquid immersion exposure, a gap between a projection lens on an exposure device side and a wafer is filled with liquid and a refractive index of the gap is changed so as to shorten an apparent wavelength of a light source for exposure. When the liquid immersion exposure is performed by using the ArF excimer laser apparatus as the light source for exposure, a wafer is irradiated with ultraviolet light having the underwater wavelength of 134 nm. This technique is referred to as ArF immersion exposure. The ArF immersion exposure is also referred to as ArF immersion lithography.

Since the spectral line width, in natural oscillation, of the KrF and ArF excimer laser apparatuses is wide such as from about 350 pm to about 400 pm, chromatic aberration of laser light (ultraviolet light), which is reduced and projected onto the wafer by the projection lens on the exposure device side, is generated, degrading resolution. Accordingly, it is necessary to narrow the spectral line width of the laser light outputted from the gas laser apparatus to the level on which the chromatic aberration is ignorable. The spectral line width is also referred to as a spectral width. Therefore, a line narrowing module having a line narrowing element is provided in a laser resonator of the gas laser apparatus so as to realize narrowing of the spectral width by this line narrowing module. The line narrowing element may be an etalon, a grating, or the like. A laser apparatus narrowed in spectral width in this way is referred to as a narrow band laser apparatus. For example, reference is made to Japanese Unexamined Patent Application Publication (Translation of PCT Application) No. 2003-518757, Japanese Unexamined Patent Application Publication No. 2014-127651, Japanese Unexamined Patent Application Publication No. 2013-070029, Japanese Patent No. 4358052, and Japanese Patent No. 3590524.

SUMMARY

A laser apparatus according to an aspect of the present disclosure receives a signal representing a target wavelength from an external device and controls a center wavelength of laser light to be outputted. The laser apparatus includes a laser chamber, a first wavelength dispersion element, a second wavelength dispersion element, an optical element, a first actuator, a second actuator, and a control unit. The laser chamber includes a pair of electric discharge electrodes. The first wavelength dispersion element generates wavelength dispersion in a direction orthogonal to an electric discharge direction between the electric discharge electrodes. The second wavelength dispersion element generates wavelength dispersion in a direction parallel to the electric discharge direction between the electric discharge electrodes. The optical element corrects wavelength dispersion generated by the second wavelength dispersion element. The first actuator drives the first wavelength dispersion element. The second actuator drives the optical element. The control unit controls the first actuator so that the center wavelength of the laser light approaches to the target wavelength and controls the second actuator so as to correct the wavelength dispersion generated by the second wavelength dispersion element.

A laser apparatus according to another aspect of the present disclosure receives a signal representing a target wavelength from an external device and controls a center wavelength of laser light to be outputted. The laser apparatus includes a laser chamber, a first wavelength dispersion element, a second wavelength dispersion element, a first actuator, a second actuator, and a control unit. The laser chamber includes a pair of electric discharge electrodes. The first wavelength dispersion element generates wavelength dispersion in a direction orthogonal to an electric discharge direction between the electric discharge electrodes. The second wavelength dispersion element generates wavelength dispersion in a direction parallel to the electric discharge direction between the electric discharge electrodes. The first actuator drives the first wavelength dispersion element. The second actuator drives the second wavelength dispersion element. The control unit controls the first actuator so that the center wavelength of the laser light approaches to the target wavelength and controls the second actuator so as to correct the wavelength dispersion generated by the second wavelength dispersion element.

A laser apparatus according to still another aspect of the present disclosure receives a signal representing a target wavelength from an external device and controls a center wavelength of laser light to be outputted. The laser apparatus includes a laser chamber, a first wavelength dispersion element, a beam expander, a first actuator, a second actuator, and a control unit. The laser chamber includes a pair of electric discharge electrodes. The first wavelength dispersion element generates wavelength dispersion in a direction orthogonal to an electric discharge direction between the electric discharge electrodes. The beam expander includes a plurality of lenses which enlarge a beam diameter of laser light in a direction parallel to the electric discharge direction between the electric discharge electrodes, the laser light being emitted from the laser chamber and traveling in a direction away from the laser chamber. The first actuator drives the first wavelength dispersion element. The second actuator changes a distance among the lenses. The control unit controls the first actuator so that the center wavelength of the laser light approaches to the target wavelength and controls the second actuator so as to correct wavelength dispersion generated by the beam expander.

BRIEF DESCRIPTION OF THE DRAWINGS

Some example embodiments of the present disclosure are described below as mere examples with reference to the accompanying drawings.

FIG. 12 is a lateral view schematically illustrating a laser apparatus according to a fourth embodiment.

DETAILED DESCRIPTION

Figure 1:
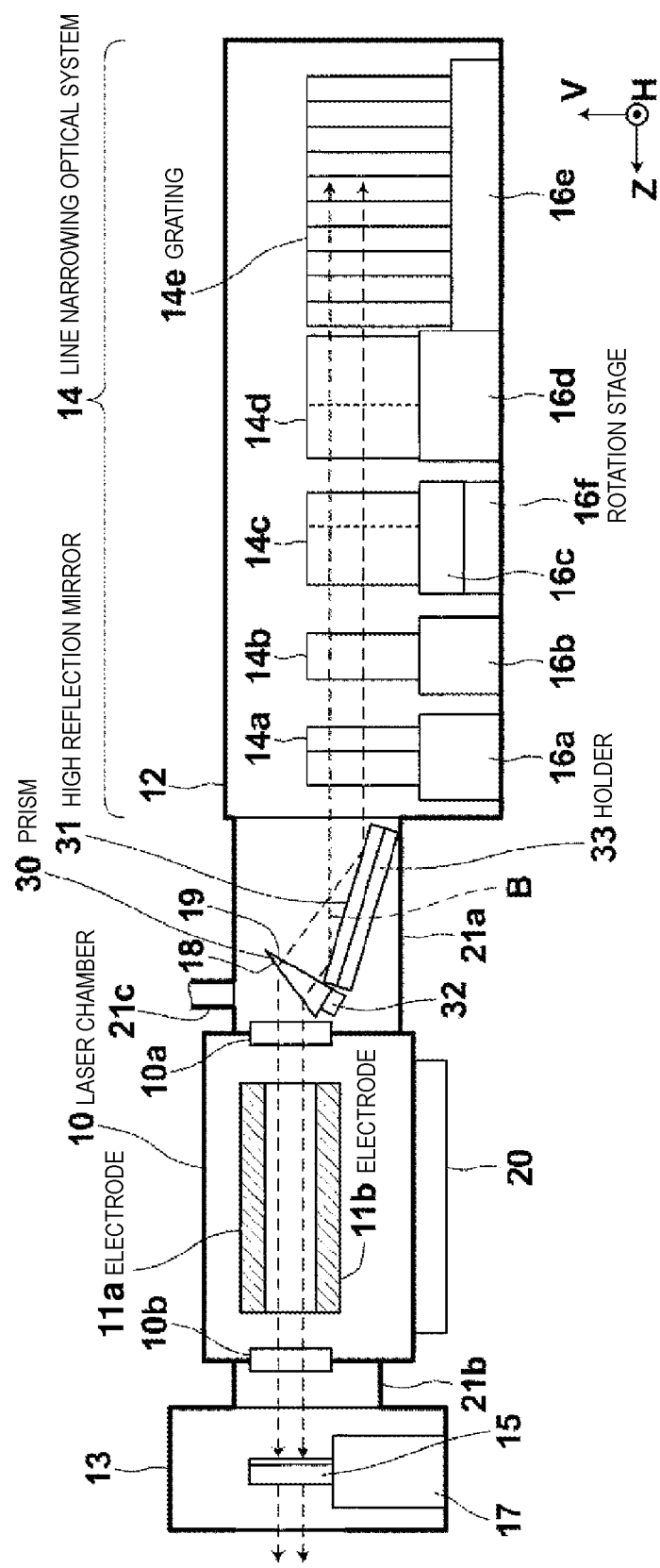
FIG. 1 is a lateral view schematically illustrating a laser apparatus according to a comparison example.

<Contents>
1. Overview
2. Laser Apparatus Having Line Narrowing Optical System
2.1 Configuration
2.1.1 Laser Chamber
2.1.2 Line Narrowing Optical System
2.1.3 Output Coupling Mirror
2.2 Operation
2.3 Issues
3.1 Configuration of First Embodiment
3.2 Operation of First Embodiment
3.3 Effects of First Embodiment
4.1 Configuration of Second Embodiment
4.2 Operation of Second Embodiment
4.3 Effects of Second Embodiment
5.1 Configuration of Third Embodiment
5.2 Operation of Third Embodiment
5.3 Effects of Third Embodiment
6.1 Configuration of Fourth Embodiment
6.2 Operation of Fourth Embodiment
6.3 Effects of Fourth Embodiment
7.1 Configuration of Fifth Embodiment
7.2 Operation of Fifth Embodiment
7.3 Effects of Fifth Embodiment
8. Other In the following, some example embodiments of the present disclosure are described in detail with reference to the drawings. Example embodiments described below each illustrate one example of the present disclosure and are not intended to limit the contents of the present disclosure. Further, all of the configurations and operations described in each example embodiment are not necessarily essential for the configurations and operations of the present disclosure. Note that like components are denoted by like reference numerals, and redundant description thereof is omitted.

1. Outline

A laser apparatus receives a signal representing a target wavelength from an external device and controls a center wavelength of laser light to be outputted. The laser apparatus includes a laser chamber and a first wavelength dispersion element. The laser chamber includes a pair of electric discharge electrodes. The first wavelength dispersion element generates wavelength dispersion in a direction orthogonal to an electric discharge direction between the electric discharge electrodes.

The laser apparatus according to an aspect of the present disclosure is configured to further include a second wavelength dispersion element, an optical element, a first actuator, a second actuator, and a control unit. The second wavelength dispersion element generates wavelength dispersion in a direction parallel to the electric discharge direction between the electric discharge electrodes. The optical element corrects wavelength dispersion generated by the second wavelength dispersion element. The first actuator drives the first wavelength dispersion element. The second actuator drives the optical element. The control unit controls the first actuator so that the center wavelength of the laser light approaches to the target wavelength and controls the second actuator so as to correct the wavelength dispersion generated by the second wavelength dispersion element.

The laser apparatus according to another aspect of the present disclosure is configured to further include a second wavelength dispersion element, a first actuator, a second actuator, and a control unit. The second wavelength dispersion element generates wavelength dispersion in a direction parallel to the electric discharge direction between the electric discharge electrodes. The first actuator drives the first wavelength dispersion element. The second actuator drives the second wavelength dispersion element. The control unit controls the first actuator so that the center wavelength of the laser light approaches to the target wavelength and controls the second actuator so as to correct the wavelength dispersion generated by the second wavelength dispersion element.

The laser apparatus according to still another aspect of the present disclosure is configured to further include a beam expander, a first actuator, a second actuator, and a control unit. The beam expander includes a plurality of lenses which enlarge a beam diameter of laser light in a direction parallel to the electric discharge direction between the electric discharge electrodes, the laser light being emitted from the laser chamber and traveling in a direction away from the laser chamber. The first actuator drives the first wavelength dispersion element. The second actuator changes a distance among the lenses. The control unit controls the first actuator so that the center wavelength of the laser light approaches to the target wavelength and controls the second actuator so as to correct wavelength dispersion generated by the beam expander.

Note that terms such as "parallel" and "orthogonal" in the present disclosure do not strictly define numerical values of angles and so forth but these terms are intended to contain errors within practical ranges. The practical ranges of errors are within approximately ±10 degrees from exactly parallel or orthogonal, in general.

2. Laser Apparatus Having Line Narrowing Optical System

2.1 Configuration

Figure 2:
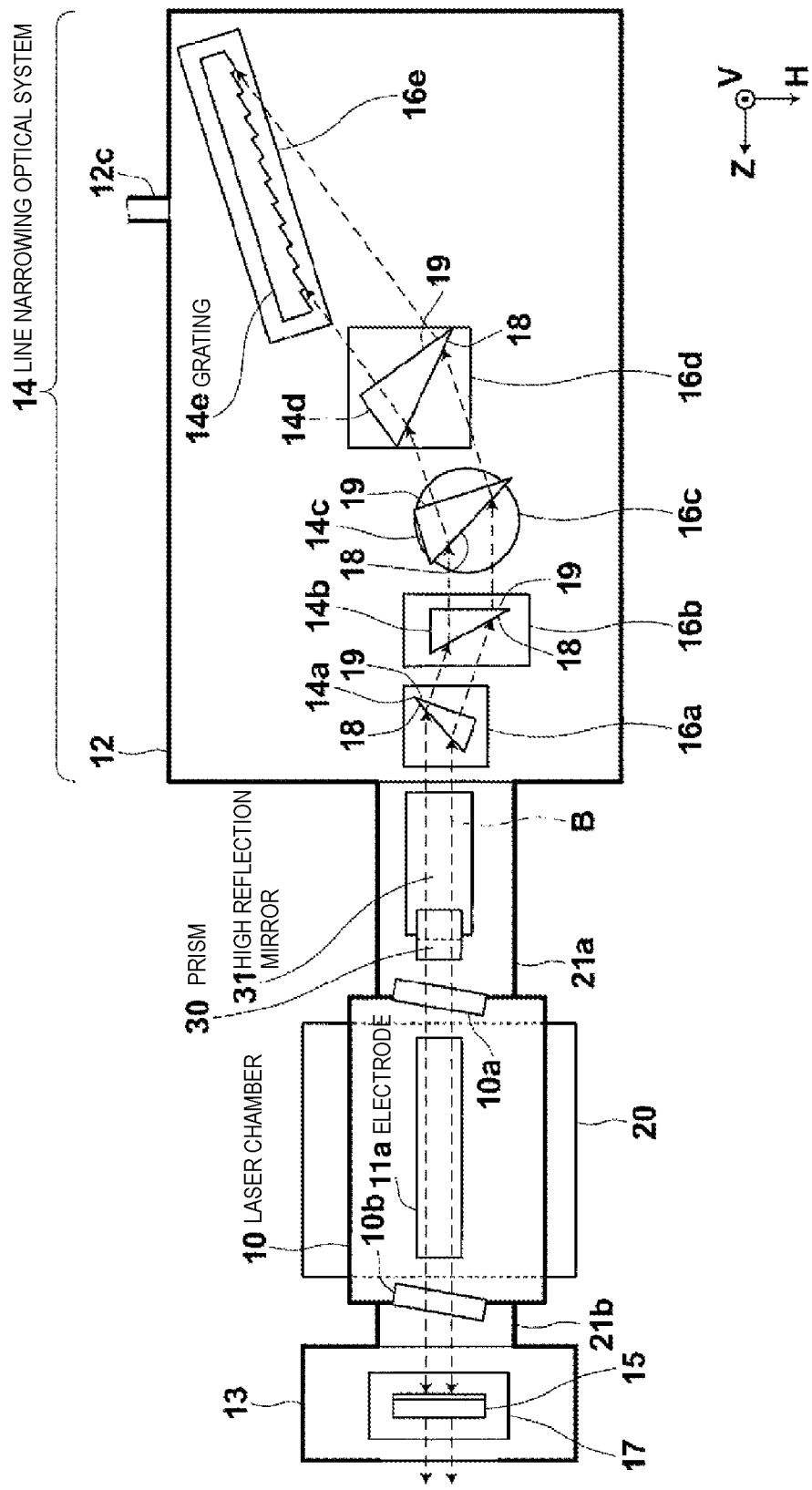
FIG. 2 is a plan view schematically illustrating the laser apparatus according to the comparison example.

FIG. 1 and FIG. 2 schematically illustrate the configuration of a laser apparatus according to a comparison example. The laser apparatus illustrated in FIG. 1 and FIG. 2 is a narrow band excimer laser apparatus, for example. This laser apparatus includes a laser chamber 10, an output coupling mirror 15, optical path tubes 21a and 21b, and a line narrowing optical system 14. The line narrowing optical system 14 and the output coupling mirror 15 constitute an optical resonator. The laser chamber 10 is disposed on an optical path of the optical resonator. The laser apparatus may be a master oscillator which performs laser oscillation and outputs seed light to be made incident on an amplifier which is not illustrated.

FIG. 1 illustrates the internal configuration of the laser apparatus viewed from a direction substantially orthogonal to an electric discharge direction between a pair of electric discharge electrodes 11a and 11b which are included in the laser chamber 10. FIG. 2 illustrates the internal configuration of the laser apparatus viewed from a direction substantially parallel to the electric discharge direction between the electric discharge electrodes 11a and 11b and viewed from a direction substantially orthogonal to a traveling direction of laser light outputted from the output coupling mirror 15. The traveling direction of laser light outputted from the output coupling mirror 15, that is, a direction in which an optical path extends is defined as the Z direction. The Z direction is a longitudinal direction of the electric discharge electrodes 11a and 11b. The electric discharge direction of the electric discharge electrodes 11a and 11b is the V direction which is orthogonal to the Z direction. A direction which is orthogonal to both of these directions is defined as the H direction. The −V direction may be substantially accorded with the gravity direction.

2.1.1 Laser Chamber

Laser gas serving as a laser medium is sealed in the laser chamber 10. The laser medium includes argon gas or krypton gas as rare gas, fluorine gas as halogen gas, and neon gas as buffer gas, for example. On the both ends of the laser chamber 10, windows 10a and 10b are provided. The windows 10a and 10b are disposed so that laser light which is discharged and excited to be amplified between the electric discharge electrodes 11a and 11b is incident on the windows 10a and 10b. The laser chamber 10 is supported by a holder 20.

The electric discharge electrodes 11a and 11b are disposed inside the laser chamber 10 as electrodes for exciting the laser medium through discharge. To the electric discharge electrodes 11a and 11b, high pulse-like voltage is applied from a pulse power module which is not illustrated. The windows 10a and 10b are disposed so that a light incident surface with respect to these windows 10a and 10b and the HZ surface are substantially parallel to each other and an incident angle of the light is substantially equal to the Brewster angle.

2.1.2 Line Narrowing Optical System

A line narrowing optical system is sometimes referred to as a line narrowing module (LNM). The line narrowing optical system 14 in this example includes at least one prism, a grating 14e, holders 16a to 16e, and a casing 12. In this example, at least one prism corresponds to four prisms 14a to 14d. The four prisms 14a to 14d expand a beam in the H direction which is substantially orthogonal to the electric discharge direction. Each of the four prisms 14a to 14d is made of calcium fluoride (CaF2) crystal. Each of the four prisms 14a to 14d has two surfaces 18 and 19 through which a beam passes. These prisms are arranged so that a beam to pass through the surface 18 is obliquely incident on the surface 18 and a beam to pass through the surface 19 is substantially-orthogonally incident on the surface 19. A beam is refracted on the surface 18 and the beam is subjected to wavelength dispersion in a surface orthogonal to the V axis. The surface 19 suppresses refraction of a beam. The surface 18 is coated with a film that suppresses reflection of P polarization components contained in laser light. The surface 19 is coated with a film that suppresses reflection of laser light. The grating 14e is an echelle grating that contains a material of high reflectance on a surface thereof and on which a multiple grooves are formed at predetermined intervals. These prisms 14a to 14d and the grating 14e correspond to the first wavelength dispersion element according to an aspect of the present disclosure that generates wavelength dispersion in a direction orthogonal to the electric discharge direction between the electric discharge electrodes 11a and 11b.

The casing 12 accommodates the prisms 14a to 14d, the grating 14e, and the holders 16a to 16e. Inside the casing 12, the prism 14a is supported by the holder 16a, the prism 14b is supported by the holder 16b, the prism 14c is supported by the holder 16c, the prism 14d is supported by the holder 16d, and the grating 14e is supported by the holder 16e. The holder 16c supporting the prism 14c can be rotated by a rotation stage 16f about an axis parallel to the V axis so as to adjust an oscillation wavelength. The rotation stage 16f constitutes the first actuator according to an aspect of the present disclosure.

The casing 12 is connected with the laser chamber 10 by the optical path tube 21a. The inside of the optical path tube 21a and the inside of the casing 12 communicate with each other. To the casing 12, an inert gas introduction tube 12c is connected on a position away from the optical path tube 21a. To the optical path tube 21a, an inert gas exhaustion tube 21c is connected on a position away from the casing 12. The casing 12 and the optical path tube 21a are purged such that inert gas is introduced from the inert gas introduction tube 12c into the casing 12 and exhausted from the inert gas exhaustion tube 21c of the optical path tube 21a.

In the optical path tube 21a, a prism 30 and a high reflection mirror 31 that constitute a V direction beam expander are arranged. The prism 30 is held by a holder 32 and the high reflection mirror 31 is held by a holder 33. The high reflection mirror 31 is disposed so that an optical path axis of a light beam which is emitted from the laser chamber 10 and is incident on the prism 30 is substantially parallel to an optical path axis of the light beam emitted from the high reflection mirror 31 as described later. The prism 30 corresponds to a second wavelength dispersion element according to an aspect of the present disclosure that generates wavelength dispersion in a direction parallel to the electric discharge direction between the electric discharge electrodes 11a and 11b. Further, the high reflection mirror 31 corresponds to an optical element according to an aspect of the present disclosure.

2.1.3 Output Coupling Mirror

The output coupling mirror 15 is accommodated in a casing 13. The output coupling mirror 15 is supported by a holder 17 inside the casing 13. A surface, which is closer to the laser chamber 10, of the output coupling mirror 15 is coated with a partial reflection film and the other surface is coated with a reflection suppressing film.

The casing 13 is connected with the laser chamber 10 by the optical path tube 21b. The inside of the optical path tube 21b and the inside of the casing 13 communicate with each other. An inert gas introduction tube and an inert gas exhaustion tube, which are not illustrated, are connected to the inside of the optical path tube 21b and the casing 13 and the inside of the optical path tube 21b and the inside of the casing 13 are purged with the inert gas.

2.2 Operation

When high voltage is applied between the electric discharge electrodes 11a and 11b, electric discharge occurs between the electric discharge electrodes 11a and 11b. Energy of this electric discharge excites the laser medium inside the laser chamber 10, causing the energy level of the laser medium to shift to a high energy level. When the energy level of the excited laser medium then shifts to a low energy level, light having a wavelength corresponding to the energy level difference is discharged.

The light generated inside the laser chamber 10 is outputted to the outside of the laser chamber 10 through the windows 10a and 10b. The beam-like light outputted from the window 10a of the laser chamber 10 is enlarged in a beam diameter in the V direction by the prism 30 and is reflected by the high reflection mirror 31, inputting into the line narrowing optical system 14. The beam-like light is enlarged in the beam diameter in the H direction by the prisms 14a to 14d in sequence and is made incident on the grating 14e in the line narrowing optical system 14. The beam-like light will be referred to below as a "light beam B" and is denoted with "B" in the drawings.

The light beam B incident on the grating 14e from the prisms 14a to 14d is reflected by a plurality of grooves of the grating 14e and is diffracted in a direction corresponding to the wavelength of the light. The grating 14e is desirably disposed in Littrow arrangement so that an incident angle of the light beam B incident on the grating 14e from the prisms 14a to 14d is accorded with a diffraction angle of diffracted light having a desired wavelength. Accordingly, the light beam B having a wavelength around the desired wavelength is returned to the laser chamber 10 through the prisms 14a to 14d.

The prisms 14a to 14d reduce the beam diameter in the H direction of the light beam B, which is reflected and diffracted at the grating 14e, and return the light beam B to the electric discharge region of the laser chamber 10 through the window 10a.

The output coupling mirror 15 transmits and outputs part of the light beam B outputted from the window 10b of the laser chamber 10 and reflects and returns the remainder to the laser chamber 10.

The light beam B emitted from the laser chamber 10 may thus reciprocate between the line narrowing optical system 14 and the output coupling mirror 15 and may be amplified every time the light beam B passes through the electric discharge space between the electric discharge electrodes 11a and 11b and cause laser oscillation. The light beam B is pulse light, for example, and the band thereof is narrowed every time the light beam B is turned back in the line narrowing optical system 14. Further, by the arrangement of the window 10a and 10b and coating of the prisms 14a to 14d, described above, the linearly polarized components in the H direction may be selected. Light thus amplified may be outputted as laser light from the output coupling mirror 15. This laser light may have a wavelength of a vacuum ultraviolet range. The wavelength of the laser light may be approximately 193.4 nm. If the prism 14c is rotated by the rotation stage 16f as described above, an incident angle of the light beam B onto the grating 14e can be changed and thus an oscillation wavelength of the laser light can be controlled.

Further, the V direction beam expander composed of the prism 30 and the high reflection mirror 31 enlarges the beam diameter of the light beam B, which is incident on the line narrowing optical system 14, in the V direction as well, in this example. Consequently, energy density of the light beam B incident on each optical component of the line narrowing optical system 14 may be lowered. As a result, distortion of a wave front of the beam caused by heat generation of each optical component of the line narrowing optical system 14 is reduced and the spectral line width of the laser light outputted from this laser apparatus is stabilized.

2.3 Issues

Figure 3:
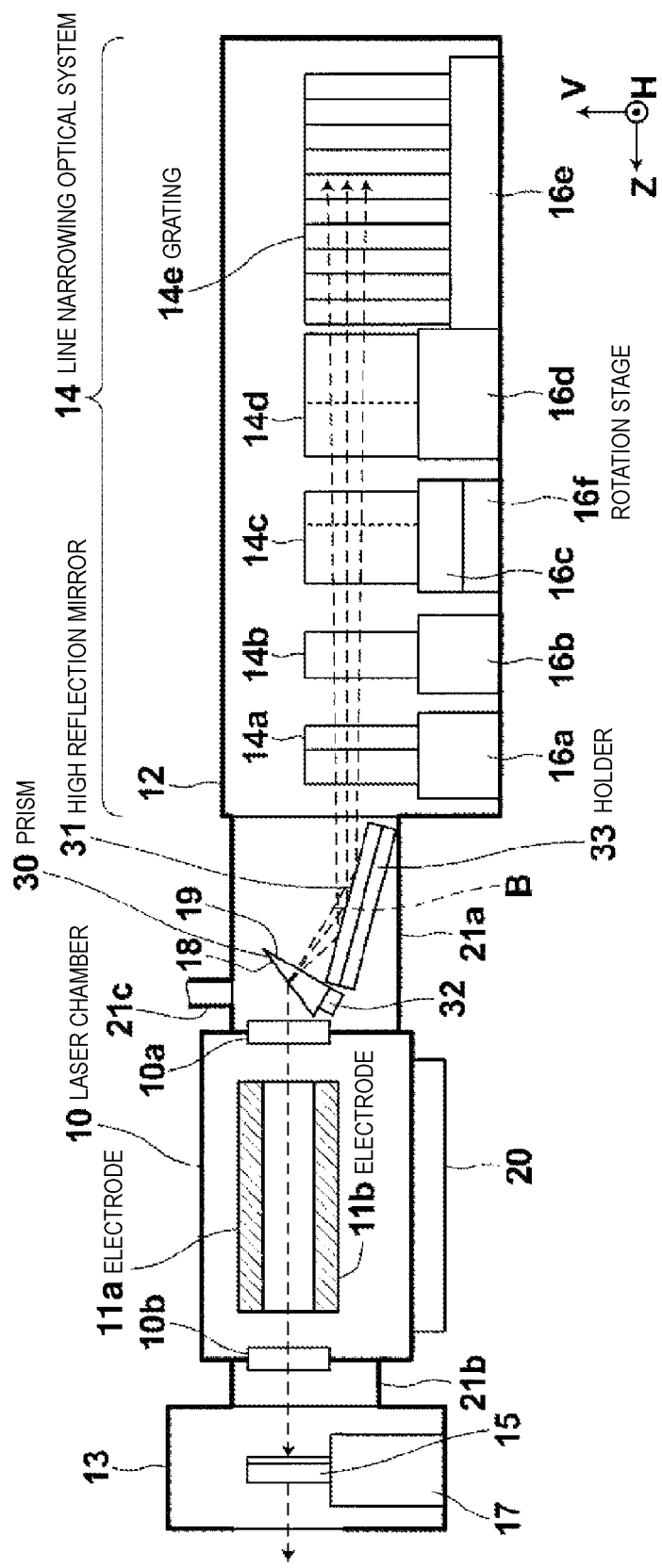
FIG. 3 is a schematic view for describing issues of the laser apparatus according to the comparison example.

An oscillation wavelength is sometimes controlled to have a desired value in the laser apparatus of the comparison example. An excimer laser apparatus for exposure device needs to be controlled to have an oscillation wavelength in a range from 193.300 nm to 193.457 nm, for example. If an oscillation wavelength is changed when the V direction beam expander, which is composed of the prism 30 and the high reflection mirror 31, is applied, a refraction angle of the light beam B on the prism 30 is changed and pointing of laser light outputted from the optical resonator is therefore changed to the V direction. This pointing or the beam pointing means an optical path position of outputted laser light. FIG. 3 schematically illustrates the state that the refraction angle of the light beam B is changed. Specifically, when the oscillation wavelength is changed from 193.300 nm to 193.457 nm, pointing in one round traveling of laser light in the optical resonator is shifted in the V direction by 0.439 (=0.158+0.281) rad. Since laser light reciprocates in the optical resonator approximately six times in practical laser oscillation, pointing of the laser light outputted from the optical resonator is shifted up to 2.63 rad. An example of change in the optical path position of laser light in the V direction is shown in Table 1 for three oscillation wavelengths. In this example, it is assumed that an optical path position at oscillation wavelength $\lambda$=193.368 nm is represented as no displacement, that is, represented that change is 0 (zero) rad. Further, regrading a sign of position change, it is assumed that the V direction is positive and the −V direction is negative.

TABLE 1

| Wavelength λ (nm) | V direction position change of laser light (mrad) |
|---|---|
| 193.300 | 0.158 |
| 193.368 | 0 |
| 193.457 | −0.281 |

Further, if an oscillation wavelength is changed, a beam profile and beam divergence, that is, a spread angle of outputted laser light as well as the beam pointing may change. These changes may adversely affect exposure performance and laser oscillation when the laser apparatus is used for an exposure device.

3.1 Configuration of First Embodiment

Figure 4:
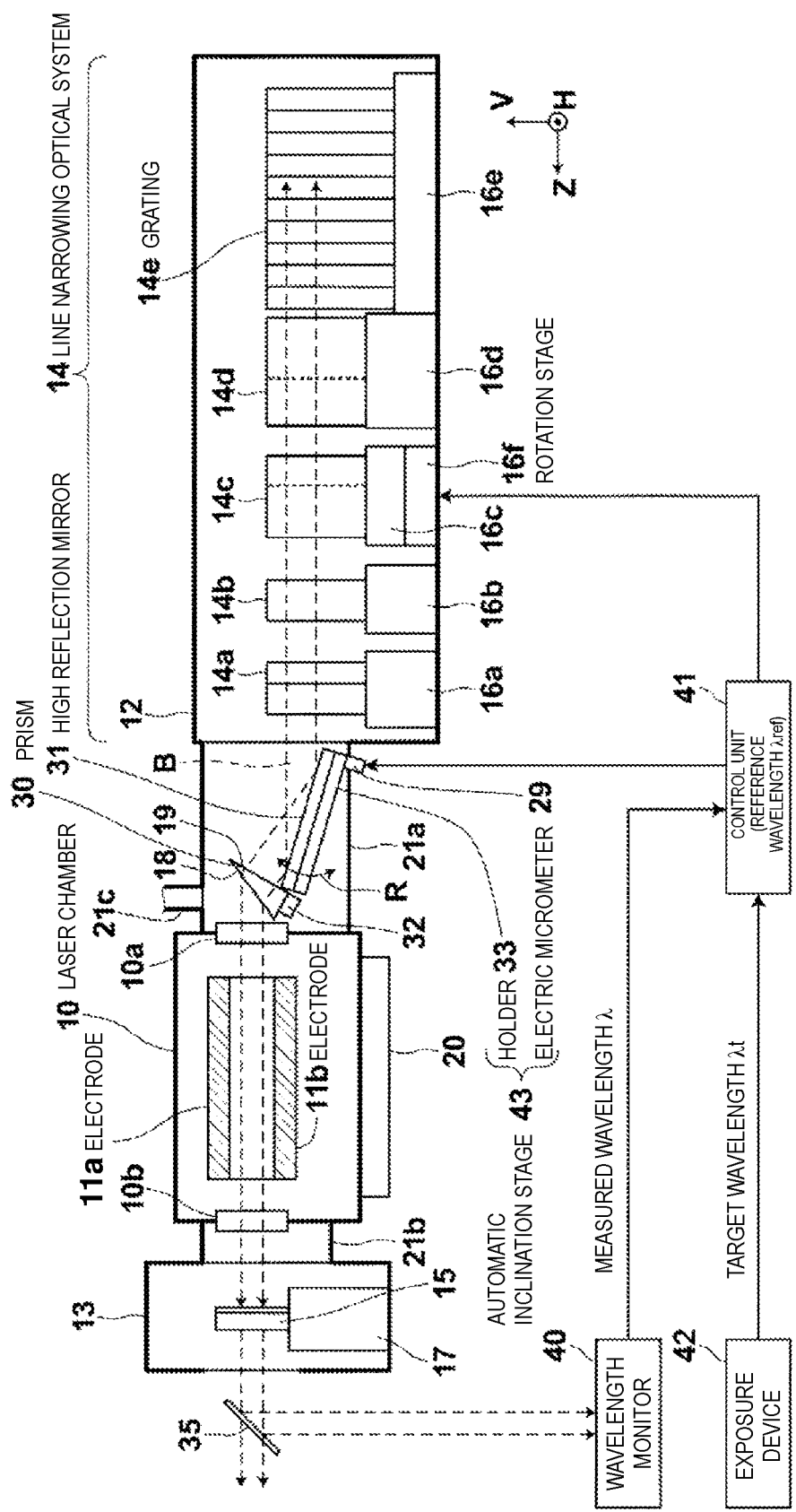
FIG. 4 is a lateral view schematically illustrating a laser apparatus according to a first embodiment.

FIG. 4 illustrates a laser apparatus according to a first embodiment of the present disclosure. The laser apparatus according to the present embodiment is different from the laser apparatus in the comparison example illustrated in FIG. 1 and FIG. 2 in the following points.

(1) A beam splitter 35 is provided. The beam splitter 35 transmits part of the light beam B outputted from the output coupling mirror 15 and reflects the remainder.

(2) A wavelength monitor 40, a control unit 41, and an automatic inclination stage 43 are provided. The wavelength monitor 40 detects a wavelength of the light beam B reflected by the beam splitter 35. The control unit 41 receives a signal outputted from an exposure device 42 and representing a target wavelength $\lambda t$. The automatic inclination stage 43 includes an electric micrometer 29. The exposure device 42 corresponds to an external device according to an aspect of the present disclosure.

The wavelength monitor 40 is a spectroscope. The wavelength monitor 40 may, for example, be an etalon spectroscope including an image sensor for measuring a radius of an interference pattern generated by a monitor etalon. The electric micrometer 29 is joined to the holder 33 holding the high reflection mirror 31. The holder 33 and the electric micrometer 29 constitute the automatic inclination stage 43 that may rotate in the direction denoted by the arrow R about an axis parallel to the H axis.

The control unit 41 receives a signal which is outputted from the wavelength monitor 40 and represents a measured wavelength λ of the light beam B and a signal that represents the above-described target wavelength $\lambda t$ and controls driving of the automatic inclination stage 43 and driving of the rotation stage 16f of the line narrowing optical system 14 in response to these signals. The automatic inclination stage 43 corresponds to a second actuator according to an aspect of the present disclosure.

3.2 Operation of First Embodiment

Figure 5:
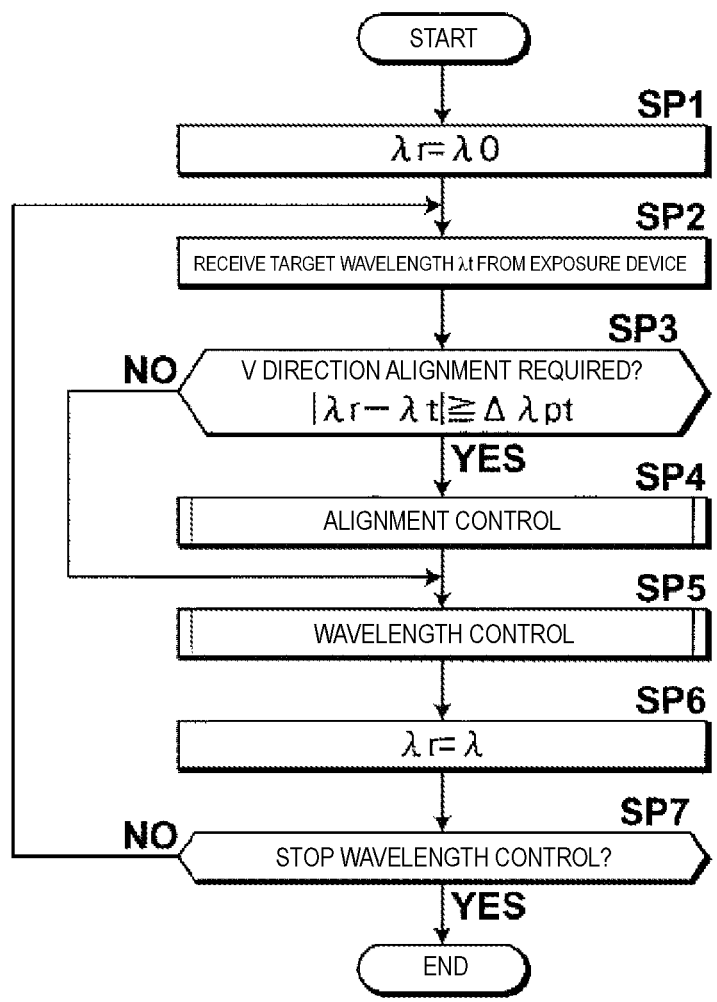
FIG. 5 is a flowchart illustrating control processing performed by a control unit of the apparatus illustrated in FIG. 4.

FIG. 5 illustrates a flow of control processing performed by the control unit 41. The control processing according to the present embodiment will be described below with reference to FIG. 5. In the processing of FIG. 5, the control unit 41 first sets a current wavelength $\lambda r$ as an initial value $\lambda 0$ in step SP1. This initial value $\lambda 0$ is set, for example, as $\lambda 0=193.000$ nm which is out of a laser oscillation range. Next, in step SP2, the control unit 41 receives a signal that is outputted from the exposure device 42 and represents the target wavelength $\lambda t$. After that, in step SP3, the control unit 41 determines whether or not alignment control in the V direction for the optical resonator needs to be performed. The alignment in the V direction for the optical resonator represents that positions of at least part of optical components in the optical resonator are set so that the optical path position of the light beam B in the V direction is changed. Hereinafter, the alignment in the V direction for the optical resonator is sometimes referred to as the V direction alignment of the optical resonator. Further, the optical components for changing the V direction optical path position of the light beam B are referred to as optical elements. The V direction alignment control of the optical resonator represents that the V direction position of the high reflection mirror 31 is set by the automatic inclination stage 43 composed of the holder 33 and the electric micrometer 29, in the present embodiment. More specifically, the determination processing is processing for determining whether or not an absolute value of a difference between the current wavelength $\lambda r$ and the target wavelength $\lambda t$ is larger than a predetermined value $\Delta \lambda pt$. Here, the value of $\Delta \lambda pt$ is set as approximately $\Delta \lambda pt=10$ picometers (pm) to 30 pm, for example. Furthermore, both of the current wavelength $\lambda r$ and the target wavelength $\lambda t$ are center wavelengths more particularly.

When the control unit 41 determines that the V direction alignment control of the optical resonator needs to be performed, the control unit 41 subsequently performs alignment control processing depending on the target wavelength $\lambda t$ in step SP4 and then, the control unit 41 performs wavelength control processing in step SP5. On the other hand, when the control unit 41 determines that the V direction alignment control of the optical resonator does not need to be performed, the control unit 41 skips the processing of step SP4 and performs the wavelength control processing in step SP5. The alignment control processing and the wavelength control processing will be detailed later.

When the control unit 41 completes the processing of step SP5, the control unit 41 then sets the measured wavelength λ, which is obtained by the wavelength monitor 40, as the current wavelength $\lambda r$ in step SP6. Then, in step SP7, the control unit 41 determines whether or not the wavelength control may be stopped. When the wavelength control may be stopped, the control unit 41 ends the processing. On the other hand, when the control unit 41 determines that the wavelength control should not be stopped, the flow of the processing returns to step SP2 and the processing from step SP2 is repeated in the same manner as that described above.

Figure 6:
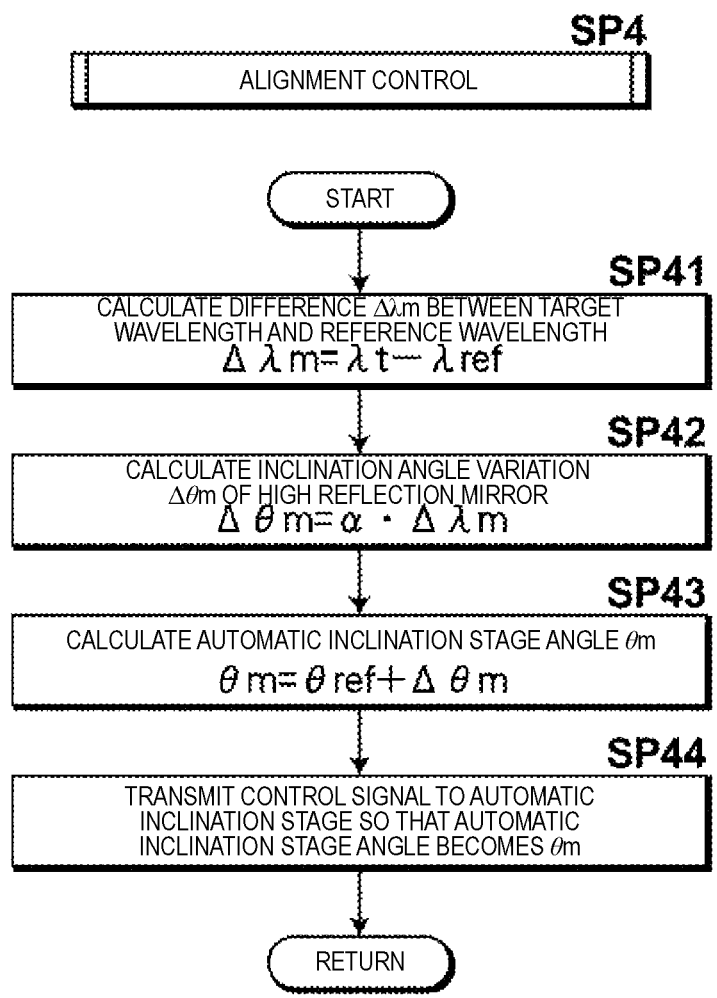
FIG. 6 is a flowchart illustrating alignment control processing in the control processing illustrated in FIG. 5.

FIG. 6 illustrates a flow of the alignment control processing in step SP4 illustrated in FIG. 5. The alignment control processing will be described below with reference to FIG. 6. First, in step SP41, the control unit 41 calculates the difference $\Delta \lambda m$ between the target wavelength $\lambda t$ and the reference wavelength $\lambda ref$, that is, $\Delta \lambda m = \lambda t - \lambda ref$. The value of the reference wavelength $\lambda ref$ is set to 193.368 nm, for example. Next, in step SP42, the control unit 41 calculates an inclination angle variation $\Delta \theta m$ of the high reflection mirror 31 which is to be set depending on the above-described difference $\Delta \lambda m$. This calculation is performed as $\Delta \theta m = \alpha \cdot \Delta \lambda m$ in which α denotes a proportional constant, for example.

Subsequently, in step SP43, the control unit 41 calculates an angle $\theta m$ of the automatic inclination stage 43, that is, the angle of the high reflection mirror 31 based on the above-described inclination angle variation $\Delta \theta m$. Specifically, this calculation is performed as $\theta m = \theta ref + \Delta \theta m$. Here, $\theta ref$ denotes an angle of the automatic inclination stage 43 obtained when the oscillation wavelength is the reference wavelength λref. Then, in step SP44, the control unit 41 transmits a control signal to the electric micrometer 29 constituting the automatic inclination stage 43 so that the angle of the automatic inclination stage 43 becomes θm. Through the above-described processing, the angle of the high reflection mirror 31 can be changed depending on the value of the target wavelength λt, and accordingly, change of the V direction optical path position of the light beam B caused by change of the target wavelength λt is suppressed. When the above-described processing is ended, the flow of the processing returns to the main flow of FIG. 5 and the processing from step SP5 is performed.

Figure 7:
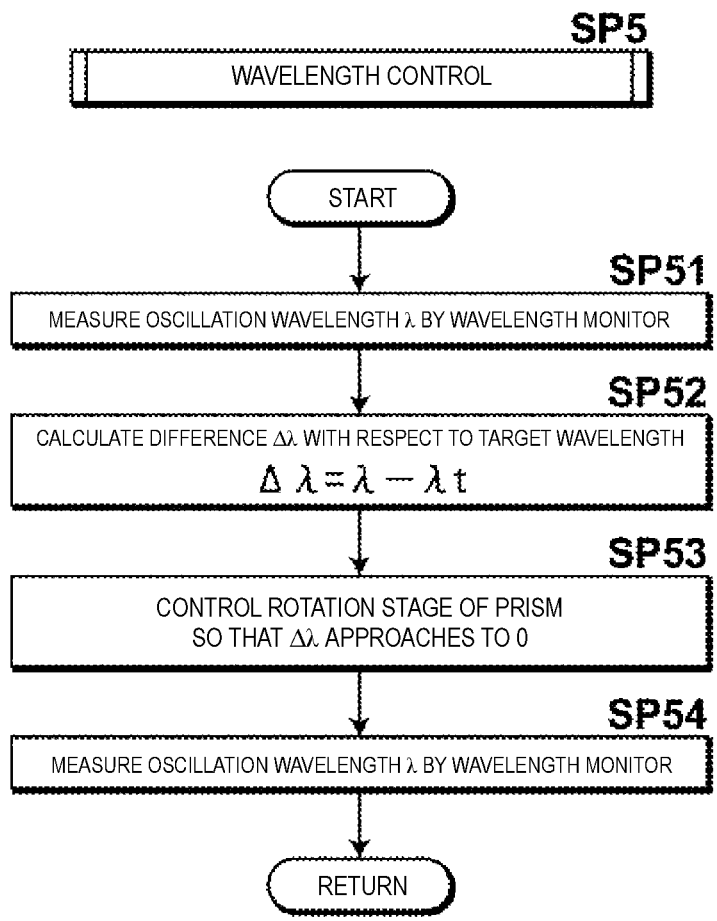
FIG. 7 is a flowchart illustrating wavelength control processing in the control processing illustrated in FIG. 5.

FIG. 7 illustrates a flow of the wavelength control processing in step SP5 illustrated in FIG. 5. The wavelength control processing will be described below with reference to FIG. 7. First, in step SP51, the control unit 41 measures the oscillation wavelength λ by the wavelength monitor 40. Next, in step SP52, the control unit 41 calculates the difference Δλ between the oscillation wavelength λ and the target wavelength λt, that is, Δλ=λ−λt. After that, in step SP53, the control unit 41 controls driving of the rotation stage 16*f* of the prism 14*c*, specifically, controls a rotation direction and a rotation amount so that the above-described difference Δλ approaches to 0. Subsequently, in step SP54, the control unit 41 measures the oscillation wavelength λ after the execution of the driving control of the rotation stage 16*f*. When the above-described processing is ended, the flow of the processing returns to the main flow of FIG. 5 and the processing from step SP6 is performed.

3.3 Effects of First Embodiment

As described above, the angle of the high reflection mirror 31 can be changed depending on the value of the target wavelength λt, and accordingly, change of the V direction optical path position of the light beam B caused by change of the target wavelength λt is suppressed in the present embodiment. As a result, fluctuation of beam pointing, beam profile, and beam divergence of outputted laser light caused by an oscillation wavelength is suppressed. This suppression of fluctuation of outputted laser light caused by change of the target wavelength λt is referred to as correction of wavelength dispersion generated by the second wavelength dispersion element in the present disclosure.

The inclination angle of the high reflection mirror 31 is controlled in the present embodiment; however, the present disclosure is not limited to this embodiment, and the V direction alignment of the optical resonator may be controlled. For example, the prism 30 of the V direction beam expander may be rotated about an axis which is substantially parallel to the H axis. Such rotation of the prism 30 can be performed by the automatic inclination stage or the rotation stage, for example. When such a configuration is employed, the automatic inclination stage or the rotation stage corresponds to the second actuator according to an aspect of the present disclosure.

Further, the V direction beam expander may be a beam expander that includes two prisms for enlarging the beam diameter of the light beam B in the V direction and is arranged so that the incident axis and the emitting axis are substantially parallel to each other. In this case, the prisms may be placed on the automatic inclination stage and may be rotated about an axis parallel to the H axis so as to control the V direction alignment of the optical resonator.

4.1 Configuration of Second Embodiment

Figure 8:
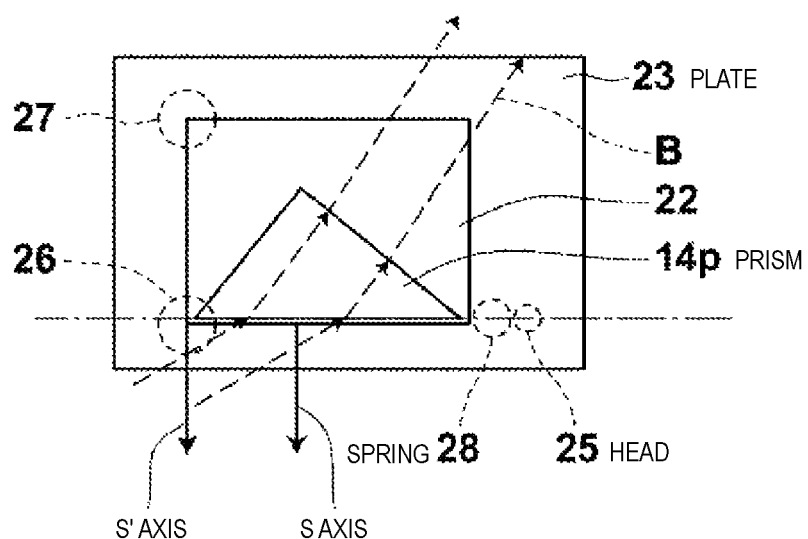
FIG. 8 is a plan view illustrating part of a laser apparatus according to a second embodiment.
Figure 9:
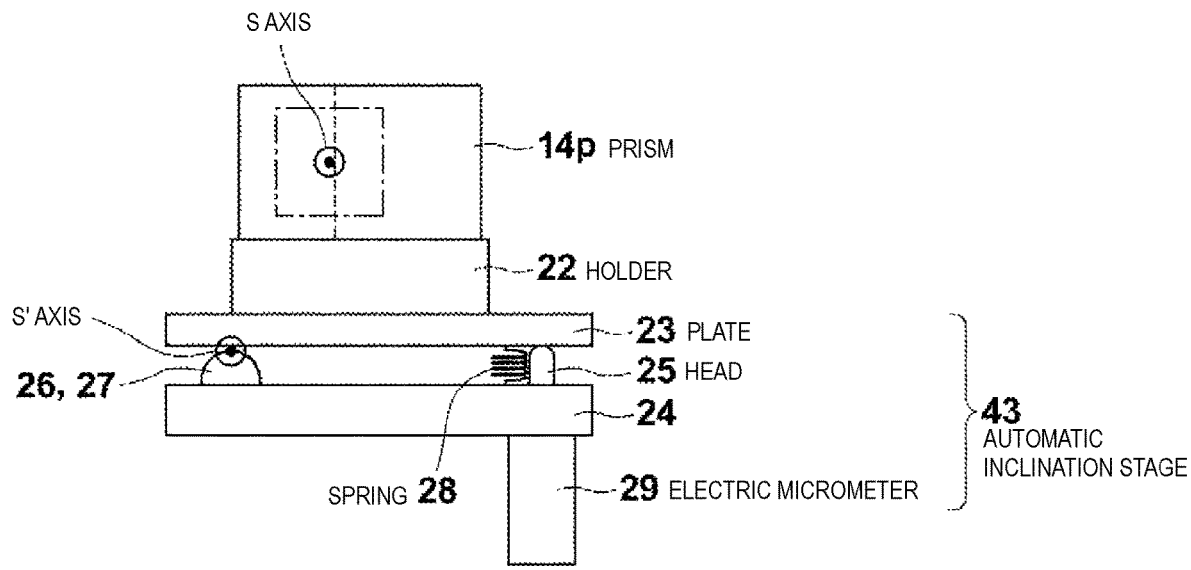
FIG. 9 is a front elevational view illustrating part of the laser apparatus according to the second embodiment.

FIG. 8 and FIG. 9 are respectively a plan view and a front elevational view that illustrate part that performs the V direction alignment of the optical resonator and is used in a laser apparatus according to a second embodiment of the present disclosure. In the present embodiment, one of the prisms 14*a* to 14*d* illustrated in FIG. 2, for example, is applied for performing the V direction alignment. In FIG. 8 and FIG. 9, one prism described above is denoted with 14*p*. This prism 14*p* is held on a plate 23 with a holder 22 interposed. The plate 23 is held on a pedestal 24 with one head 25 and two hemispheres 26 and 27 interposed. Further, the plate 23 is pulled by a spring 28 and thus brought into pressure contact with the head 25 and the hemispheres 26 and 27. The position of an upper end of the head 25 may be changed in the vertical direction by a single one-axis-driving electric micrometer 29. The prism 14*p* corresponds to an optical element that corrects wavelength dispersion generated by the second wavelength dispersion element according to an aspect of the present disclosure. Further, the holder 22, the plate 23, the pedestal 24, the head 25, the hemispheres 26 and 27, the spring 28, and the electric micrometer 29 collectively correspond to the second actuator according to an aspect of the present disclosure. In FIG. 9, a dashed-dotted line represents a region of the light beam B on a surface of the prism 14*p*.

4.2 Operation of Second Embodiment

If the position of the head 25 is changed so that the head 25 is protruded upward, the plate 23 rotationally moves in the counterclockwise direction in FIG. 9 about the S' axis while resisting against the tensile force of the spring 28 and accordingly, the prism 14*p* is moved upward. The upward moving amount of the prism 14*p* can be set to a desired value by changing the upward protruding amount of the head 25. Here, the S' axis is parallel to the S axis which is a normal line with respect to one light passing surface of the prism 14*p*.

4.3 Effects of Second Embodiment

If the position of the prism 14*p* is changed in the vertical direction as described above, the optical path position in the vertical direction of the light beam B emitted from the prism 14*p* is changed. Accordingly, the V direction alignment of the optical resonator can be performed in this case as well. Thus, the advantageous effects same as those of the first embodiment are essentially obtained in the present embodiment as well.

5.1 Configuration of Third Embodiment

Figure 10:
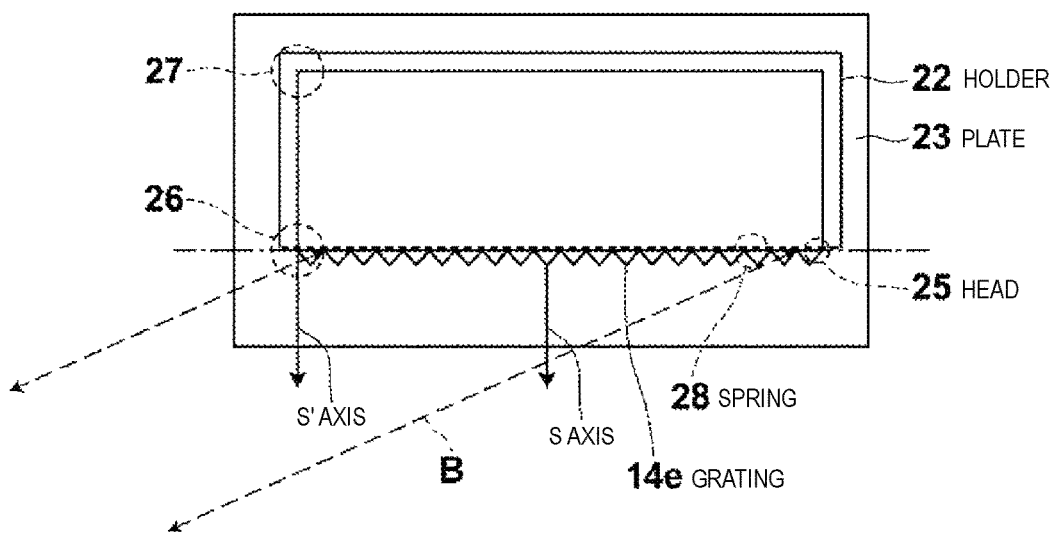
FIG. 10 is a plan view illustrating part of a laser apparatus according to a third embodiment.
Figure 11:
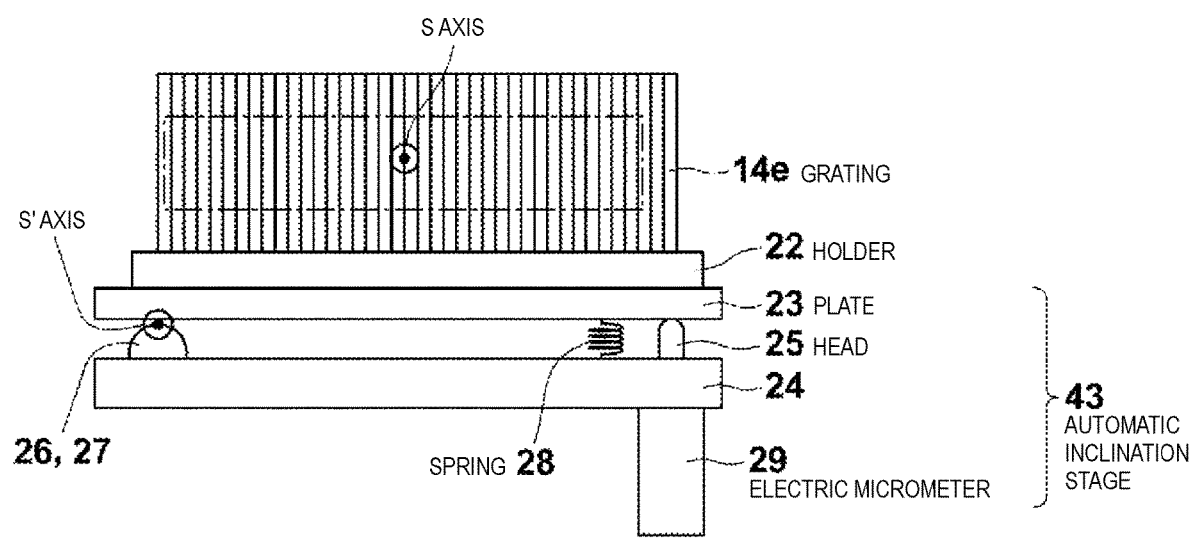
FIG. 11 is a front elevational view illustrating part of the laser apparatus according to the third embodiment.

FIG. 10 and FIG. 11 are respectively a plan view and a front elevational view that illustrate part that performs the V direction alignment of the optical resonator and is used in a laser apparatus according to a third embodiment of the present disclosure. The configuration of the present embodiment is different from the configuration of FIG. 8 and FIG. 9 in that the grating 14*e* illustrated in FIG. 2, for example, is used in the present embodiment instead of the prism 14*p*. That is, the grating 14*e* is held on the plate 23 with the holder 22 interposed. The plate 23 is held on the pedestal 24 with one head 25 and two hemispheres 26 and 27 interposed. Further, the plate 23 is pulled by the spring 28 and thus brought into pressure contact with the head 25 and the hemispheres 26 and 27. The position of the upper end of the head 25 may be changed in the vertical direction by the electric micrometer 29. The grating 14e corresponds to the optical element that corrects wavelength dispersion generated by the second wavelength dispersion element according to an aspect of the present disclosure. Further, the holder 22, the plate 23, the pedestal 24, the head 25, the hemispheres 26 and 27, the spring 28, and the electric micrometer 29 collectively correspond to the second actuator according to an aspect of the present disclosure. In FIG. 11, a dashed-dotted line represents a region of the light beam B on a surface of the grating 14e.

5.2 Operation of Third Embodiment

If the position of the head 25 is changed so that the head 25 is protruded upward, the plate 23 rotationally moves in the counterclockwise direction in FIG. 11 about the S' axis while resisting against the tensile force of the spring 28 and accordingly, the grating 14e is inclined. The angle of the inclination of the grating 14e can be set to a desired value by changing the upward protruding amount of the head 25.

5.3 Effects of Third Embodiment

If the grating 14e is inclined as described above, an optical path position in the vertical direction of the light beam B reflected and diffracted by the grating 14e is changed. Accordingly, the V direction alignment of the optical resonator can be performed in this case as well. Thus, the advantageous effects same as those of the first embodiment are essentially obtained in the present embodiment as well.

6.1 Configuration of Fourth Embodiment

Figure 12:
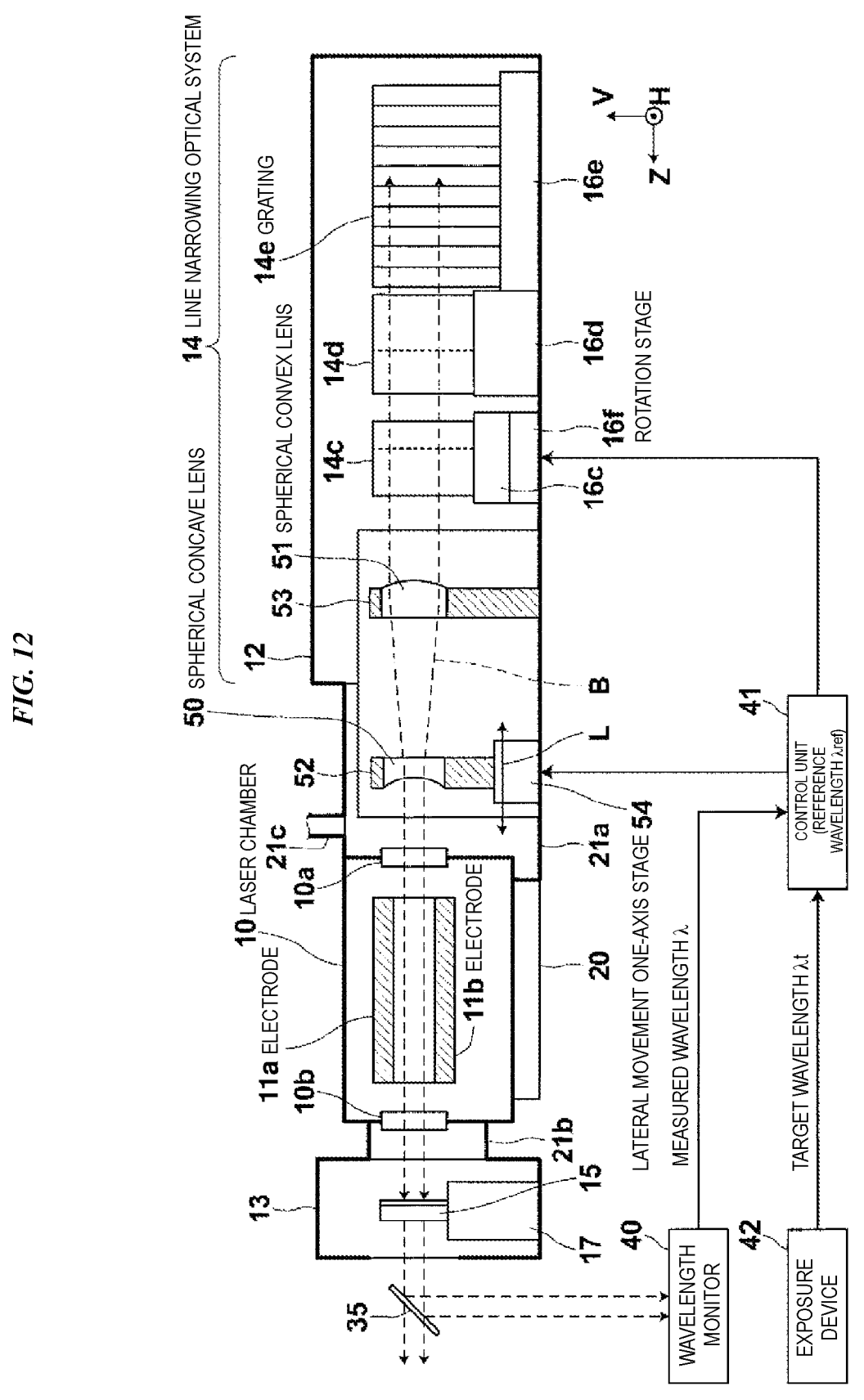

FIG. 12 illustrates a laser apparatus according to a fourth embodiment of the present disclosure. The laser apparatus according to the present embodiment is different from the laser apparatus according to the first embodiment illustrated in FIG. 4 in the following points.

(1) A spherical concave lens 50 and a spherical convex lens 51 are used instead of the prism 30 and the high reflection mirror 31 respectively.

(2) A lateral movement one-axis stage 54 including a one-axis actuator is used instead of the automatic inclination stage 43. This lateral movement one-axis stage 54 moves the spherical concave lens 50 in the optical axis direction, that is, in the Z direction. The control unit 41 controls driving of the lateral movement one-axis stage 54 instead of driving of the automatic inclination stage 43.

(3) The prisms 14a and 14b of the line narrowing optical system 14 illustrated in FIG. 4 are omitted.

Figure 13:
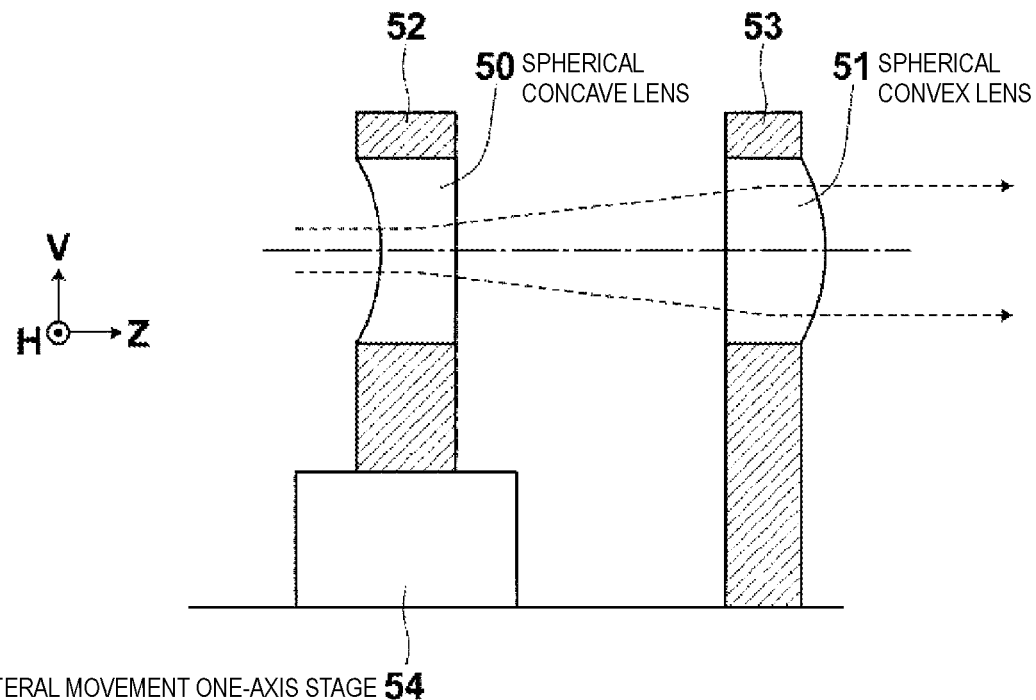
FIG. 13 is a lateral view illustrating lenses used in the laser apparatus illustrated in FIG. 12.

The two lenses 50 and 51 are disposed on the optical path between the laser chamber 10 and the prism 14c. These lenses 50 and 51 are made of calcium fluoride (CaF2) crystal having resistance to a wavelength of the ultraviolet range. Light passing surfaces of these lenses 50 and 51 are coated with a reflection reducing film. As illustrated also in FIG. 13 in an enlarged manner, the spherical concave lens 50 is held by a holder 52. Further, the spherical convex lens 51 is held by a holder 53. The holder 52 is held by the optical path tube 21a with the lateral movement one-axis stage 54 interposed and the holder 53 is directly held by the casing 12. The spherical concave lens 50 and the spherical convex lens 51 are disposed so that focal positions of the spherical concave lens 50 and the spherical convex lens 51 are substantially accorded with each other. The lateral movement one-axis stage 54 constitutes the second actuator according to an aspect of the present disclosure.

Figure 14:
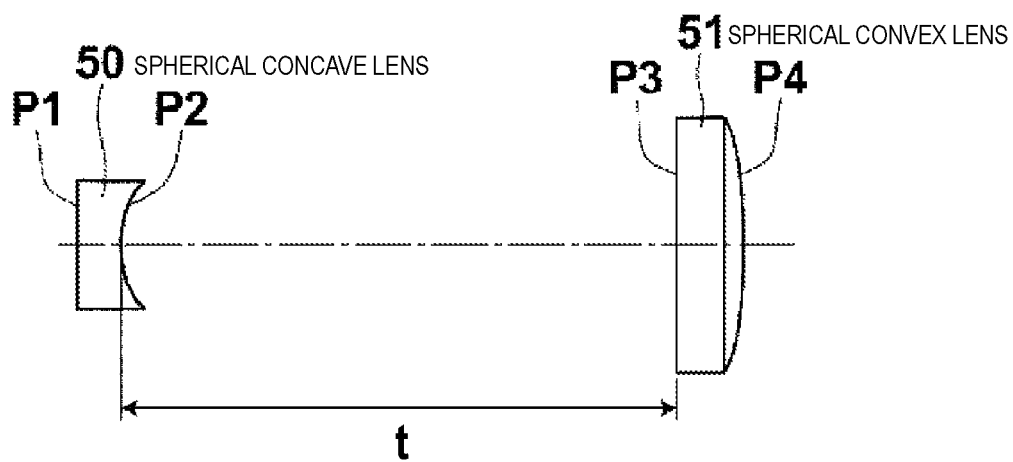
FIG. 14 is a schematic view for describing a specification of lenses to be used in the laser apparatus.

The spherical concave lens 50 and the spherical convex lens 51 desirably have magnifications M of 3 to 5, and more desirably have magnifications M of approximately 4. Favorable examples of the curvature radius of the light passing surfaces of the spherical concave lens 50 and the spherical convex lens 51 and inter-surface distance t between these lenses 50 and 51 are shown in Table 2 for respective wavelengths λ of the light beam B. FIG. 14 illustrates the light passing surfaces P1 to P4 and the inter-surface distance t in this favorable example. The example in which a plano-concave lens is used as the spherical concave lens 50 and a plano-convex lens is used as the spherical convex lens 51 is described here. However, numerical values are shown in this example for the case where the spherical concave lens 50 is disposed so that a concave surface of the spherical concave lens 50 faces the spherical convex lens 51, unlike the configuration of FIG. 12. Units of numerical values shown in Table 2 are nm for the wavelength λ and mm for the rest. Further, regarding the curvature radius, a value is positive when the light passing surface is protruded toward the light incident side, that is, toward the laser chamber 10, while a value is negative when the light passing surface is recessed. Here, the magnification of these lenses 50 and 51 is 3.9.

TABLE 2

| Wavelength λ | Inter-surface distance t | P1 curvature radius | P2 curvature radius | P3 curvature radius | P4 curvature radius |
|---|---|---|---|---|---|
| 193.300 | 239.887 | ∞ | 44.1 | ∞ | −171.0 |
| 193.368 | 239.895 | ∞ | 44.1 | ∞ | −171.0 |
| 193.457 | 239.909 | ∞ | 44.1 | ∞ | −171.0 |

The beam expander is composed of two spherical lenses in the present embodiment; however, the configuration is not limited to this embodiment. More spherical lenses may be further added so as to shorten the size in the optical path direction and suppress wave front aberration. Further, the beam expander unit composed of lenses may have the configuration in which aspherical lenses are combined.

The lateral movement one-axis stage 54 including a one-axis actuator drives to move the spherical concave lens 50 in the Z direction via the holder 52. As the one-axis actuator, a stepping motor, a piezo actuator, a voice coil motor, and the like, for example, may be applied.

6.2 Operation of Fourth Embodiment

The light beam B which is outputted from the laser chamber 10 and travels toward the grating 14e passes through the spherical concave lens 50 and the spherical convex lens 51 to have the beam diameter which is enlarged in the V direction and the H direction by the substantially same magnifications. Since the light passing surfaces of both lenses 50 and 51 are coated with the reflection reducing film, the light beam B efficiently passes through both lenses 50 and 51.

The light beam B whose beam diameter is thus enlarged in the V direction and the H direction is incident on the prism 14c, the prism 14d, and the grating 14e of the line narrowing optical system 14 in sequence.

Figure 15:
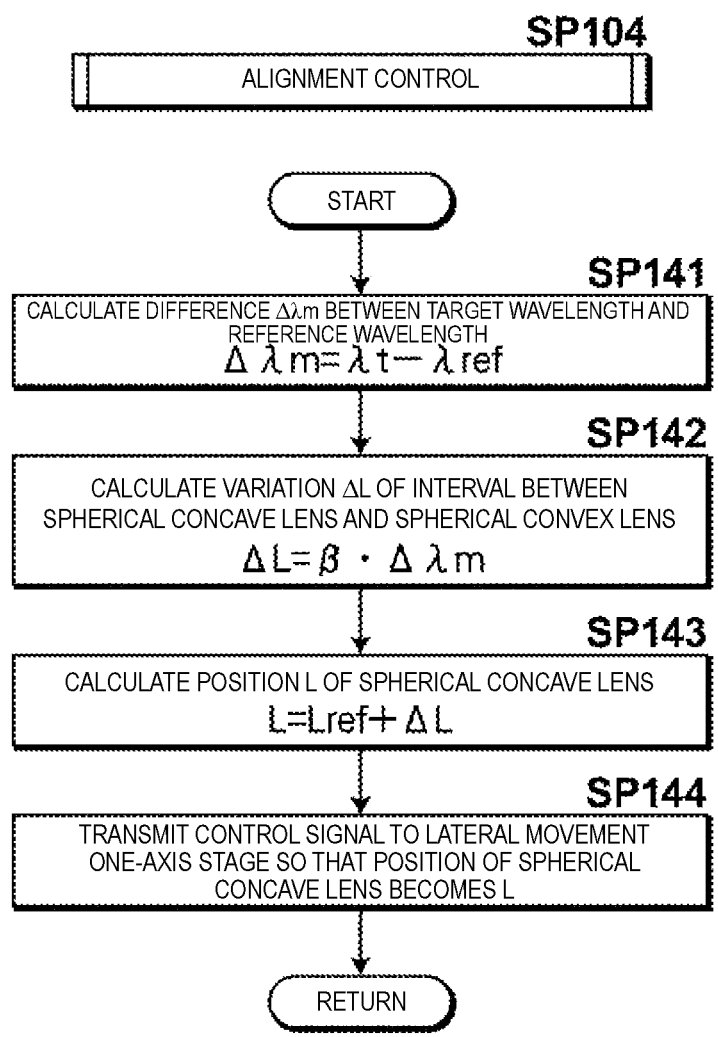
FIG. 15 is a flowchart illustrating alignment control processing in the laser apparatus illustrated in FIG. 12.

Control by the control unit 41 in the present embodiment will now be described. The control is essentially performed in a similar manner to the processing illustrated in FIG. 5, and only the alignment control performed by the control unit 41 is different from that in the processing illustrated in FIG. 5. That is, alignment control of step SP104 illustrated in FIG. 15 is performed in the present embodiment instead of the alignment control of step SP4 illustrated in FIG. 5. This alignment control will be described below with reference to FIG. 15.

When the control unit 41 determines that the V direction alignment of the optical resonator needs to be performed in step SP3 illustrated in FIG. 5, the control unit 41 first calculates the difference $\Delta\lambda m$ between the target wavelength $\lambda t$ and the reference wavelength $\lambda ref$, that is, $\Delta\lambda m=\lambda t-\lambda ref$, in step SP141 of FIG. 15. The value of the reference wavelength $\lambda ref$ is set to 193.368 nm, for example. Next, in step SP142, the control unit 41 calculates the variation $\Delta L$ of an interval between the spherical concave lens 50 and the spherical convex lens 51. This calculation is performed as $\Delta L=\beta\cdot\Delta\lambda m$ in which $\beta$ denotes a proportional constant, for example.

Subsequently, in step SP143, the control unit 41 calculates a proper position L of the spherical concave lens 50 based on the above-described variation $\Delta L$. This calculation is performed as $L=Lref+\Delta L$. Here, Lref denotes a position of the spherical concave lens 50 obtained when the oscillation wavelength is the reference wavelength $\lambda ref$. Then, in step SP144, the control unit 41 transmits a control signal to the actuator constituting the lateral movement one-axis stage 54 so that the position of the spherical concave lens 50 becomes the proper position L. Through the above-described processing, the position of the spherical concave lens 50 can be changed depending on the value of the target wavelength $\lambda t$, and accordingly, focal positions of the spherical concave lens 50 and the spherical convex lens 51 are constantly accorded with each other irrespective of the value of the target wavelength $\lambda t$. When the above-described processing is ended, the flow of the processing returns to the main flow of FIG. 5 and the processing from step SP5 is performed.

As specific examples of numerical values, when the oscillation wavelength $\lambda$ shown in Table 2 above is changed from 193.300 nm to 193.457 nm, the distance between the spherical concave lens 50 and the spherical convex lens 51 can be changed to be the distance longer by 22 μm than that before the change.

6.3 Effects of Fourth Embodiment

The beam expander composed of the combination of the spherical concave lens 50 and the spherical convex lens 51 is applied in the present embodiment. In this configuration, when the oscillation wavelength is changed, the focal distance between the lens 50 and the lens 51 is changed and accordingly, the wave front of the light beam B in the beam expander is distorted. As a result, beam divergence and the spectral line width of outputted laser light may be changed. However, since the lenses 50 and 51 need to be made of a single material, that is, calcium fluoride (CaF2) crystal having resistance to a wavelength of the ultraviolet range as described above, it is difficult to correct the above-described chromatic aberration.

On the other hand, by performing the above-described control for changing the position of the spherical concave lens 50 depending on the value of the target wavelength $\lambda t$, distortion of the wave front of the light beam B caused by the change of the oscillation wavelength is suppressed. As a result, change of beam divergence and change of the spectral line width of outputted laser light are suppressed. This suppression of fluctuation of outputted laser light is referred to as correction of wavelength dispersion generated by the beam expander in the present disclosure.

The position of the spherical concave lens 50 in the optical axis direction is controlled in the present embodiment; however, the present disclosure is not limited to this embodiment, and the above-described distortion of the wave front may be suppressed by other configurations. For example, the position of the spherical convex lens 51 in the optical axis direction may be controlled.

7.1 Configuration of Fifth Embodiment

Figure 16:
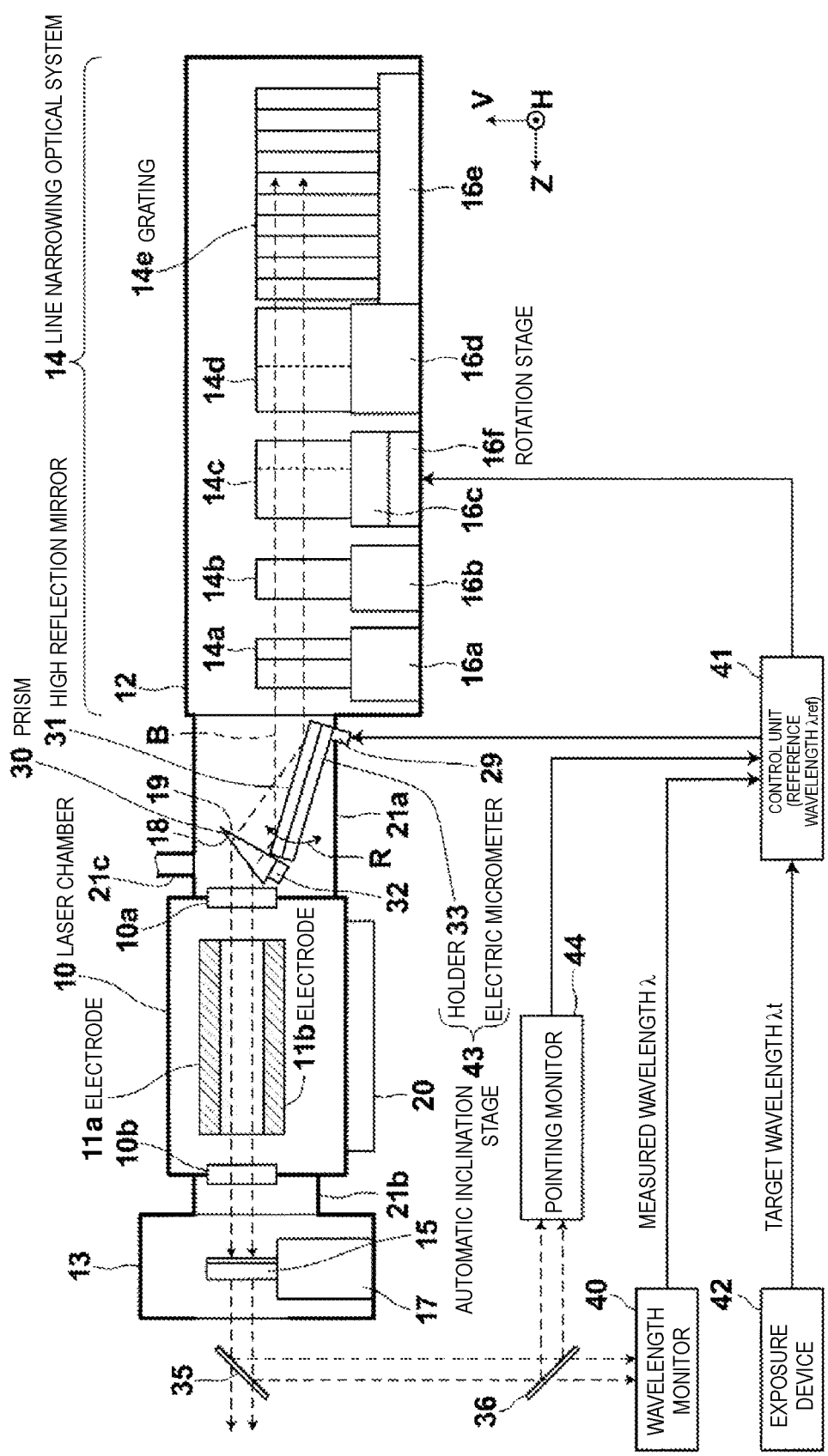
FIG. 16 is a lateral view schematically illustrating a laser apparatus according to a fifth embodiment.

FIG. 16 illustrates a laser apparatus according to a fifth embodiment of the present disclosure. The laser apparatus according to the present embodiment is different from the laser apparatus according to the first embodiment illustrated in FIG. 4 in the following point.

(1) A beam splitter 36 and a pointing monitor 44 are provided. The beam splitter 36 branches part of the light beam B reflected at the beam splitter 35. The pointing monitor 44 detects an optical path position of the light beam B which is branched.

The pointing monitor 44 is configured to include a condenser lens and a two-dimensional image sensor, for example, where the two-dimensional image sensor is disposed on a focal position of the condenser lens. An output signal of this pointing monitor 44 is inputted into the control unit 41.

7.2 Operation of Fifth Embodiment

Figure 17:
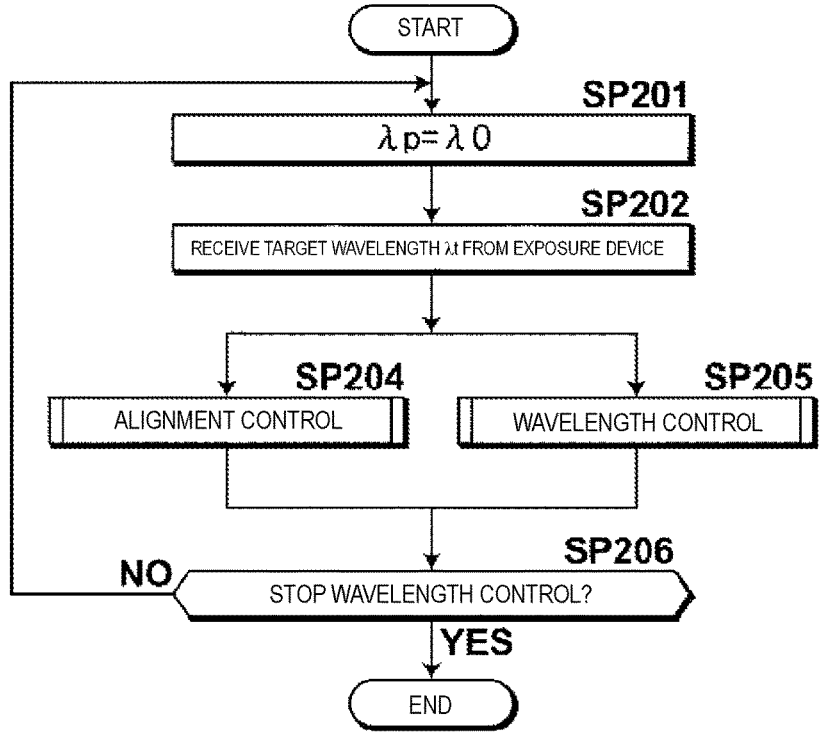
FIG. 17 is a flowchart illustrating control processing performed by a control unit of the apparatus illustrated in FIG. 16.

FIG. 17 illustrates a flow of the control processing performed by the control unit 41. The control processing according to the present embodiment will be described below with reference to FIG. 17. In the processing of FIG. 17, the control unit 41 first sets a current wavelength $\lambda p$ as an initial value $\lambda 0$ in step SP201. This initial value $\lambda 0$ is set, for example, as $\lambda 0=193.000$ nm which is out of a laser oscillation range. Next, in step SP202, the control unit 41 receives a signal that is outputted from the exposure device 42 and represents the target wavelength $\lambda t$. Subsequently, in step SP204, the control unit 41 performs V direction alignment control of the optical resonator. The V direction alignment control of the optical resonator represents that the V direction position of the high reflection mirror 31 is set by the automatic inclination stage 43 composed of the holder 33 and the electric micrometer 29, in the present embodiment as well. Further, in step SP205, the control unit 41 performs wavelength control in parallel with the V direction alignment control. This wavelength control is essentially performed in a similar manner to the wavelength control in the first embodiment illustrated in FIG. 7.

Then, in step SP206, the control unit 41 determines whether or not the wavelength control may be stopped. When the wavelength control may be stopped, the control unit 41 ends the processing. On the other hand, when the control unit 41 determines that the wavelength control should not be stopped, the flow of the processing returns to step SP201 and the processing from step SP201 is repeated in the same manner as that described above.

Figure 18:
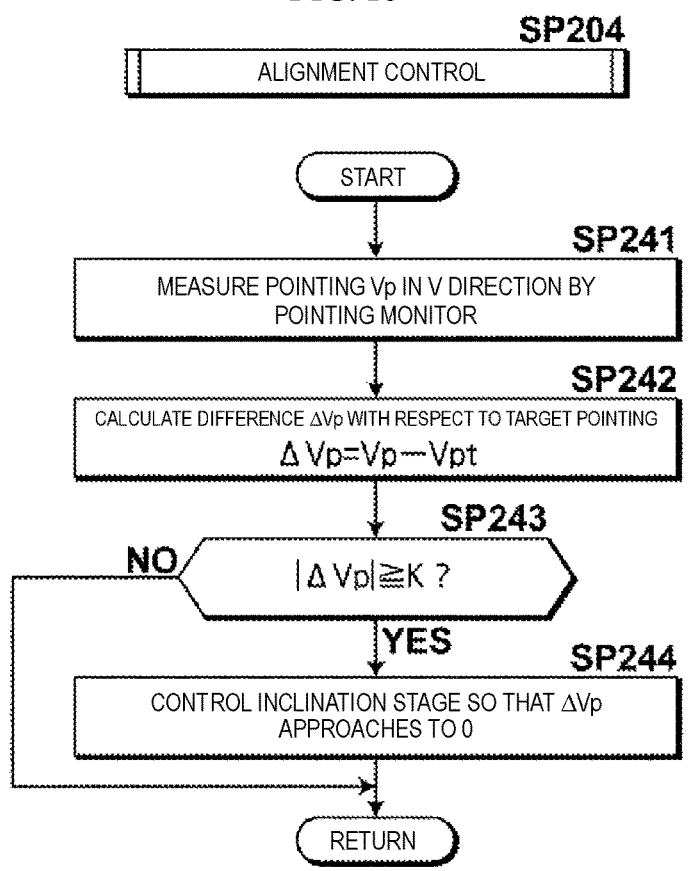
FIG. 18 is a flowchart illustrating alignment control processing in the control processing illustrated in FIG. 17.

FIG. 18 illustrates a flow of the alignment control processing in step SP204 illustrated in FIG. 17. The alignment control processing will be described below with reference to FIG. 18. First, in step SP241, the control unit 41 measures pointing Vp in the V direction based on an output signal from the pointing monitor 44. Next, in step SP242, the control unit 41 calculates the difference ΔVp between the pointing Vp, which is measured, and the target pointing Vpt, that is, ΔVp=Vp−Vpt. Here, the target pointing Vpt is pointing of the light beam B obtained when the V direction alignment of the optical resonator is normal.

Subsequently, in step SP243, the control unit 41 determines whether or not an absolute value of the above-described difference ΔVp is a tolerance K or larger. The tolerance K is set to a value of approximately 0.025 mrad, for example. When it is determined that the absolute value of the difference ΔVp is not the tolerance K or larger, the flow of the processing returns to the main flow of FIG. 17 and the processing from step SP206 is performed.

On the other hand, when it is determined that the absolute value of the difference ΔVp is the tolerance K or larger, the control unit 41 then controls, in step SP244, the automatic inclination stage 43 so that the difference ΔVp approaches to 0 (zero). The control of the automatic inclination stage 43 represents that driving of the electric micrometer 29, which constitutes the automatic inclination stage 43 with the holder 33, is controlled as the first embodiment, and accordingly, the position of the high reflection mirror 31 in the V direction can be changed. After that, the flow of the processing returns to the main flow of FIG. 17 and the processing from step SP206 is performed.

As specific examples of numerical values, when the reference wavelength λref is 193.368 nm described above, 0.0028 mrad of optical axis misalignment is generated per 1 pm of wavelength depending on deviation of the oscillation wavelength from the reference wavelength. The optical axis misalignment causes misalignment of the beam pointing position, and the automatic inclination stage 43 is therefore controlled so that the beam pointing measured by the pointing monitor 44 goes to a target measurement position.

7.3 Effects of Fifth Embodiment

As described above, pointing is measured by the pointing monitor 44 and the V direction alignment of the optical resonator is controlled so that the pointing goes to the target pointing, in the present embodiment. As a result, fluctuation of beam divergence and beam profile of outputted laser light caused by an oscillation wavelength is suppressed.

The inclination angle of the high reflection mirror 31 is controlled in the present embodiment; however, the present disclosure is not limited to this embodiment, and the V direction alignment of the optical resonator may be controlled by other configurations. For example, the prism constituting the V direction beam expander may be rotated about an axis substantially parallel to the H axis by the automatic inclination stage, the rotation stage, or the like. Further, the configurations illustrated in FIG. 8 and FIG. 9 and the configurations illustrated in FIG. 10 and FIG. 11 are applicable to the present embodiment.

Further, in the example embodiment illustrated in FIG. 12 as well, a value corresponding to distortion of a wave front generated by the beam expander can be measured by measuring the size of a converged beam on the image sensor of the pointing monitor 44. Therefore, the distance between the spherical concave lens 50 and the spherical convex lens 51 of the beam expander may be controlled so that the size of the converged beam to be measured becomes the target converged beam size. Through such control, fluctuation of beam divergence and the spectral line width can be suppressed.

8. Other

The foregoing description is intended to be merely illustrative rather than limiting. It should therefore be appreciated that variations may be made in example embodiments of the present disclosure by persons skilled in the art without departing from the scope as defined by the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items. Also, the singular forms "a", "an", and "the" used in the specification and the appended claims include plural references unless expressly and unequivocally limited to one referent.

What is claimed is:

1. A laser apparatus that receives a signal representing a target wavelength from an external device and controls a center wavelength of laser light to be outputted, the laser apparatus comprising:
    a laser chamber that includes a pair of electric discharge electrodes and an optical axis, the pair of electric discharge electrodes having an electric discharge direction;
    a first wavelength dispersion element that generates wavelength dispersion in a direction that is substantially orthogonal to the electric discharge direction, the first wavelength dispersion element being positioned along an optical axis offset in an electric discharge direction from the optical axis of the laser chamber;
    a second wavelength dispersion element that generates wavelength dispersion in a direction that is substantially parallel to the electric discharge direction between the electric discharge electrodes;
    an optical element that corrects wavelength dispersion generated by the second wavelength dispersion element;
    a first actuator that drives the first wavelength dispersion element;
    a second actuator that drives the optical element; and
    a control unit that controls the first actuator so that the center wavelength of the laser light approaches to the target wavelength and controls the second actuator so as to correct the wavelength dispersion generated by the second wavelength dispersion element.

2. The laser apparatus according to claim 1, wherein the optical element is a mirror.

3. The laser apparatus according to claim 1, wherein the optical element is a prism.

4. The laser apparatus according to claim 1, wherein the optical element is a grating.

5. The laser apparatus according to claim 1, wherein the control unit performs the control of the first actuator after the control of the second actuator.

6. The laser apparatus according to claim 1, further comprising:

a pointing monitor that detects pointing of outputted laser light and inputs a result of the detection into the control unit.

7. The laser apparatus according to claim 6, wherein the control unit performs the control of the first actuator in parallel with the control of the second actuator.

8. A laser apparatus that receives a signal representing a target wavelength from an external device and controls a center wavelength of laser light to be outputted, the laser apparatus comprising:
- a laser chamber that includes a pair of electric discharge electrodes and an optical axis, the pair of electric discharge electrodes having an electric discharge direction;
- a first wavelength dispersion element that generates wavelength dispersion in a direction that is substantially orthogonal to the electric discharge direction, the first wavelength dispersion element being positioned along an optical axis offset in an electric discharge direction from the optical axis of the laser chamber;
- a second wavelength dispersion element that generates wavelength dispersion in a direction that is substantially parallel to the electric discharge direction between the electric discharge electrodes;
- a first actuator that drives the first wavelength dispersion element;
- a second actuator that drives the second wavelength dispersion element; and
- a control unit that controls the first actuator so that the center wavelength of the laser light approaches to the target wavelength and controls the second actuator so as to correct the wavelength dispersion generated by the second wavelength dispersion element.

9. The laser apparatus according to claim 8, wherein the control unit performs the control of the first actuator after the control of the second actuator.

10. The laser apparatus according to claim 8, further comprising:
- a pointing monitor that detects pointing of outputted laser light and inputs a result of the detection into the control unit.

11. The laser apparatus according to claim 10, wherein the control unit performs the control of the first actuator in parallel with the control of the second actuator.

12. A laser apparatus that receives a signal representing a target wavelength from an external device and controls a center wavelength of laser light to be outputted, the laser apparatus comprising:
- a laser chamber that includes a pair of electric discharge electrodes;
- a first wavelength dispersion element that generates wavelength dispersion in a direction orthogonal to an electric discharge direction between the electric discharge electrodes;
- a beam expander that includes a plurality of lenses, the plurality of lenses enlarging a beam diameter of laser light in a direction parallel to the electric discharge direction between the electric discharge electrodes, the laser light being emitted from the laser chamber and traveling in a direction away from the laser chamber;
- a first actuator that drives the first wavelength dispersion element;
- a second actuator that changes a distance among the lenses; and
- a control unit that controls the first actuator so that the center wavelength of the laser light approaches to the target wavelength and controls the second actuator so as to correct wavelength dispersion generated by the beam expander.

13. The laser apparatus according to claim 12, wherein the control unit performs the control of the first actuator after the control of the second actuator.

14. The laser apparatus according to claim 12, wherein
the beam expander includes a spherical concave lens and a spherical convex lens, and
the second actuator changes a distance between the spherical concave lens and the spherical convex lens.

15. The laser apparatus according to claim 12, wherein the lenses are made of calcium fluoride crystal.

16. The laser apparatus according to claim 12, wherein light passing surfaces of the plurality of lenses are coated with a reflection reducing film.

17. The laser apparatus according to claim 12, further comprising:
- a pointing monitor that detects pointing of outputted laser light and inputs a result of the detection into the control unit.

18. The laser apparatus according to claim 17, wherein the control unit performs the control of the first actuator in parallel with the control of the second actuator.

* * * * *